(12) United States Patent
Burnett

(10) Patent No.: US 12,030,543 B2
(45) Date of Patent: Jul. 9, 2024

(54) AUTONOMOUS LUGGAGE CART SYSTEM AND METHOD

(71) Applicant: Brandon Burnett, Kalaheo, HI (US)

(72) Inventor: Brandon Burnett, Kalaheo, HI (US)

( * ) Notice: Subject to any disclaimer, the term of this patent is extended or adjusted under 35 U.S.C. 154(b) by 780 days.

(21) Appl. No.: 17/204,558

(22) Filed: Mar. 17, 2021

(65) Prior Publication Data

US 2022/0297735 A1 Sep. 22, 2022

(51) Int. Cl.
*B62B 5/00* (2006.01)
*B62B 3/00* (2006.01)
*B62B 5/04* (2006.01)
*G05D 1/00* (2006.01)

(52) U.S. Cl.
CPC ............ *B62B 5/0069* (2013.01); *B62B 3/001* (2013.01); *B62B 5/0006* (2013.01); *B62B 5/004* (2013.01); *B62B 5/0053* (2013.01); *B62B 5/0079* (2013.01); *B62B 5/0447* (2013.01); *G05D 1/0221* (2013.01); *G05D 1/0246* (2013.01); *B62B 2202/24* (2013.01)

(58) Field of Classification Search
CPC ..... B62B 5/0069; B62B 3/001; B62B 5/0006; B62B 5/004; B62B 5/0053; B62B 5/0079; B62B 5/0447; B62B 2202/24; G05D 1/0246
See application file for complete search history.

(56) References Cited

U.S. PATENT DOCUMENTS

| | | | |
|---|---|---|---|
| 5,190,305 A | * | 3/1993 | Putman .................... B62B 3/10 280/47.35 |
| D550,920 S | | 9/2007 | Tuncel |
| D591,473 S | | 4/2009 | Tuncel |
| D616,173 S | | 5/2010 | Tuncel |
| 7,886,853 B2 | | 2/2011 | Konopa |
| 9,403,548 B2 | | 8/2016 | Hannah et al. |
| 9,804,018 B1 | * | 10/2017 | Muccillo .............. G08B 21/182 |
| 2008/0084039 A1 | | 4/2008 | Moulton |
| 2016/0272229 A1 | * | 9/2016 | Buckner ................. B62B 5/067 |

FOREIGN PATENT DOCUMENTS

EP 2990901 A1 * 3/2016 ........... B62B 5/0063

* cited by examiner

*Primary Examiner* — Jacob D Knutson
(74) *Attorney, Agent, or Firm* — KEATY LAW FIRM LLC; Thomas S. Keaty

(57) ABSTRACT

An autonomous luggage cart system and method for transportation of objects in facilities such as hotels, condos, universities, and convention centers, providing a cart having a floor, a bumper, riser pipes, and an underside housing, wheels driven by electric motors, a high-capacity battery and a battery charge manager, front and rear tow hitches and tow-hitch sensors, corner sensors, a camera-sensor package, directional sensors, RFID units, a controller unit applying machine learning and artificial-intelligence methods to sensor data, and a communications unit and a remote unit for external communications with other systems.

18 Claims, 7 Drawing Sheets

AUTONOMOUS LUGGAGE CART SYSTEM AND METHOD

BACKGROUND OF THE INVENTION

This invention provides an autonomous luggage cart system and method for transportation of objects in facilities such as hotels, condos, universities, and convention centers.

Bellman carts are used throughout the world to transport luggage, personal items, and goods to the rooms in a service industry such as hotel. The carts are used mainly in a service industry and they are most readily seen in hotels, airports, warehouses, and convention centers to transport luggage and personal items. The currently available luggage carts are unable to tug or tow. It is very difficult to control the movement and the direction the carts, especially when the carts are loaded with very heavy items. At present the movements of the carts are controlled by applying force to the back of the cart. In the hotel industry, the application of force to the back of the cart generates a potential danger and liability.

In addition, the carts are difficult to control and maneuver around people, into elevators, around objects, and around corners. Thus, there is a need for an electric mechanism to control speed and torque and simplify the maneuverability of the cart, as well as to increase productivity and reduce injury.

U.S. Pat. No. 9,403,548 for "Monitoring Usage or Status of Cart Retrievers," issued on Aug. 2, 2016 to assignee Gatekeeper Systems, Inc., provides for examples of systems and methods for controlling or monitoring a fleet of human-propelled, wheeled carts and cart retrievers. The carts can be shopping carts at a retail facility, and the cart retrievers can be used to collect and return the shopping carts from a parking lot near the facility to a cart collection area. The carts or cart retrievers can monitor various status or usage parameters (such as retriever battery charge, cart collection trip speed, cart collection path or duration, etc.) and transmit the parameters to a central control unit. The central control unit can analyze and process the status or usage parameters. The system can provide a user interface for access to the status or usage parameters of the cart and cart retriever fleet.

U.S. Pat. No. 9,804,018 for a "Luggage Cart Weighing Apparatus," issued on Oct. 31, 2017 to inventor Steven Richard Muccillo, provides for a luggage cart weighing apparatus that includes a luggage platform, a plurality of wheels for supporting the platform, one or more weight measuring devices, and a user interface. The one or more weight measuring devices are disposed intermediate the second surface of the platform and at least one wheel of the plurality of wheels. The user interface is disposed adjacent the platform. The user interface is in electrical communication with the one or more weight measuring devices for providing information concerning a weight of one or more items loaded onto the platform.

US Patent Application Publication No. 2008/0084039 for a "Bellman Cart," published on Apr. 10, 2008 by inventor Reynolds Ellsworth Moulton, discloses a bellman cart having a base mounted with a flat rectangular platform and several brackets. A plurality of wheels connected to the base are coupled to an integrated steering mechanism provided with a steering wheel or slidable handgrips attached to the brackets and a drivetrain arranged beneath the platform. The steering wheel pulls the cable which is passed through the brackets and connected to a pulley in the drivetrain, to turn the pulley to drive a gear mounted below the pulley, to control the horizontal movement of a rod, connected to the wheels through a pivot, to control the pivotal movement of the wheels to regulate the movement and direction of the cart. Multiple mirrors are provided to present a clear view around the loaded objects. Multiple shock absorbers are provided in one embodiment to move the cart smoothly.

U.S. Pat. No. 7,886,853 for a "Motorized Hand Cart for Lifting and Moving Large Heavy Objects," issued on Feb. 15, 2011 to inventor Kristopher R. Konopa, provides for a dual-motor handcart for lifting, steering, and transporting a heavy object, such as a snowmobile, by one person, having two motor-powered wheels or trackdrives for moving and steering attached to a width and height adjustable frame, the frame offering a handle, a pair of legs connected to the handle, lift pads for supporting the heavy object, a length adjustable lift strap for coupling the frame to the heavy object. The operatively independent motors each attached to one of the wheels providing force required for moving and steering. Thumb switches having on, off, forward, and reverse motions settings at desired speeds, control each motor providing for a single person to easily steer a cart fully loaded with a heavy object over smooth or rough terrain.

U.S. Design Pat. No. D550,920 for a "Casino Bellman's Cart," issued on Sep. 11, 2007 to assignee Levent, Incorporated, provides for the ornamental design, shown therein, for a casino bellman's cart.

U.S. Design Pat. No. D591,473 for a "Bellman's Cart," issued on Apr. 28, 2009 to assignee Levent Industries, Inc., provides for the ornamental design, shown therein, for a bellman's cart.

U.S. Design Pat. No. D616,173 for a "Luggage Cart," issued on May 18, 2010 to assignee Levent Industries, Inc., provides for the ornamental design, shown therein, for a luggage cart.

SUMMARY OF THE INVENTION

This invention provides an autonomous luggage cart system and method for transportation of objects to be used as a bellman cart, porter cart, luggage cart, hotel cart, etc., for transporting luggage and personal items in facilities such as hotels, condos, universities, and convention centers.

The autonomous luggage cart system and method provides a cart having a floor, bumper, riser pipes, and underside housing, wheels driven by electric motors, a high-capacity battery and battery charge manager, front and rear tow hitches and tow-hitch sensors, corner sensors, a camera-sensor package, directional sensors, RFID units, a controller unit applying machine learning and artificial-intelligence methods to sensor data, and a communications unit and remote unit for external communications with other systems.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
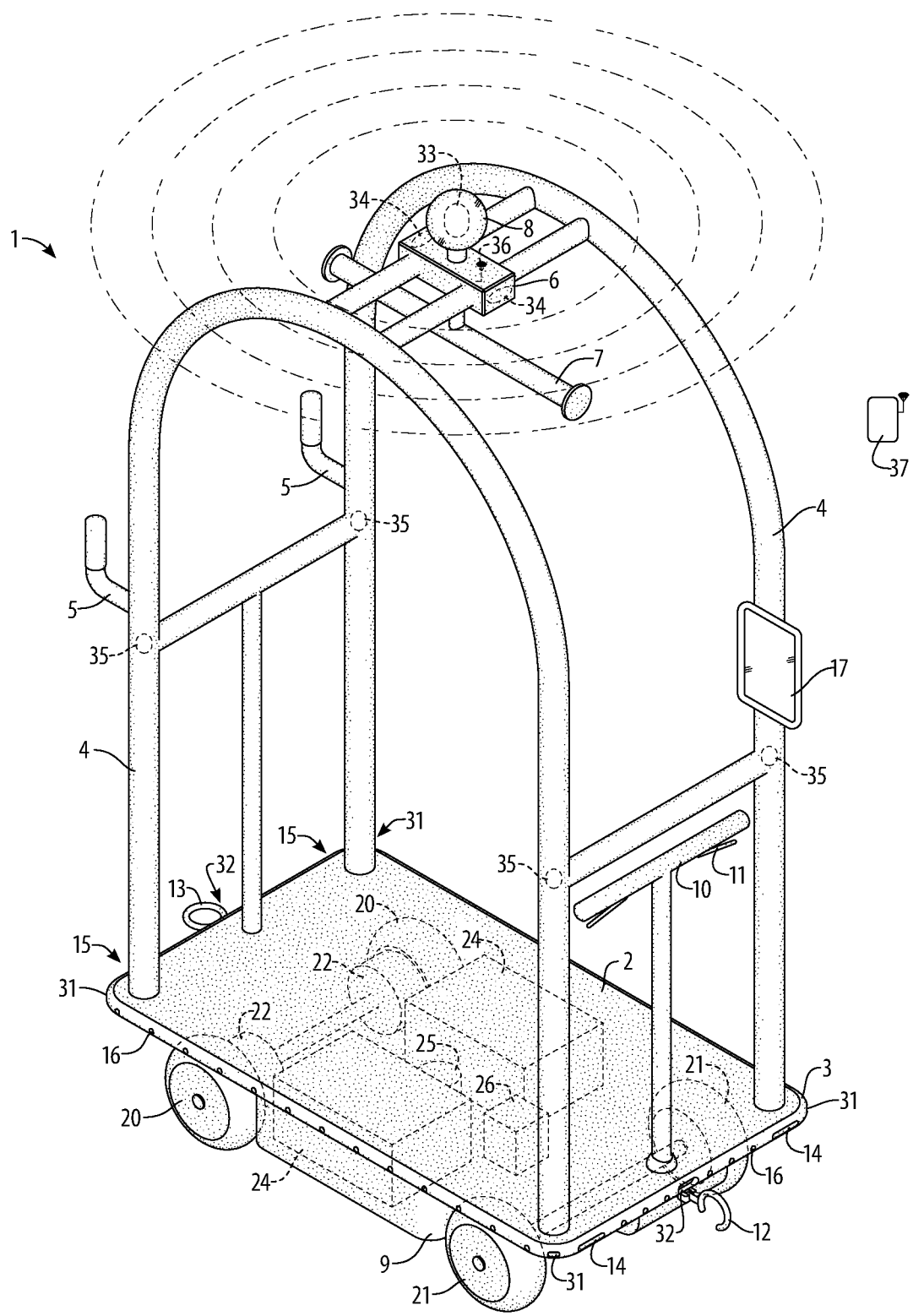
FIG. 1 is an isometric view of the autonomous luggage cart of the invention.

Referring to FIG. 1, the structure of the autonomous luggage cart 1 provides a floor 2 upon which the rest of the components are arrayed, and which provides a deck to accommodate luggage. The floor 2 is a substantially rectangular slab of hard material such as a hard plastic, wood, or laminate material. The floor is of dimensions large enough to accommodate luggage, but not so large that it will not fit into elevators or through doorways or will block others passage through hallways. A front-to-rear length of 32-42 inches inclusive and a side-to-side width of 18-24 inches inclusive is appropriate. A preferred embodiment as illustrated is 42 inches by 24 inches. The height of the floor off the ground should not exceed 12 inches, to ensure that the center of gravity remains close to the ground, as treated below. A preferred embodiment as illustrated has a floor height of 10 inches off the ground.

A bumper 3 surrounds the floor 2 and defines the outer perimeter of the autonomous luggage cart 1. The bumper 3 is made of a resilient, non-marring material such as silicone rubber, and provides some protection against the autonomous luggage cart 1 damaging objects that it comes into contact with. Optionally, the bumper 3 can be provided with sensors to indicate when the bumper 3 comes into contact with an object. At least one riser pole 4 extends upward from the floor 2 from at least two points on the floor 2. The illustrated embodiment provides two riser poles 4, each forming an arch such that each riser pole 4 extends upward from the floor 2 from two points. The length of the riser poles 4 plus the height of the floor 2 off the underlying ground defines the overall height of the autonomous luggage cart 1, which should be of overall height not more than 7 feet to pass through elevator doorways and other passages. The overall height should be sufficiently tall to provide a large, enclosed area and to provide a good line of sight above persons standing nearby. A preferred embodiment as illustrated has riser poles 4 of 68-inch length, resulting in an overall height off the ground of 78 inches. Optionally, a hand grip 5 is mounted on one or more of the riser poles 4, providing additional manual control of the autonomous luggage cart 1.

At the top of the riser poles 4 are mounted a bi-directional housing 6 and a multi-directional housing 8. Optionally, a hanging support 7 is provided for hanging garment bags and other luggage having hanging straps. The bi-directional housing 6 has a front and rear orientation appropriate for mounting sensors in a defined fixed front-facing or rear-facing orientation, as treated below. The front and rear faces of the bi-directional housing 6 can be fully or partly transparent if a camera or light sensor is mounted within. Some or all of the faces of the bi-directional housing 6 should be transparent to the passage of radio-frequency signals to allow for wireless communications, treated below. The multi-directional housing 8 is a domed, spherical, or partly spherical enclosure appropriate for sensors having wide directional coverage or having pan-and-tilt capabilities, as treated below. The multi-directional housing 8 should also be transparent to the passage of radio-frequency signals to allow for wireless communications, treated below.

An underside housing 9 is provided below the floor 2 to enclose and protect electric and electronic components, as treated below. The underside housing 9 can be made of a heat-conductive material in order to provide cooling of the enclosed components. A throttle handle 10 having a throttle brake 11 is provided for manual control of the autonomous luggage cart 1 moving under electric power, as treated below.

A front tow hitch 12 and rear tow hitch 13 are provided, as treated below. Tow-hitch sensors 32 mounted near the hitches are provided, as treated below.

A pair of front lights 14 and a pair of rear lights 15 are mounted at the front and rear of the bumper 3. Several surround lights 16 are arrayed around the bumper 3. The lights provide illumination for manual operations and for sensors or cameras using light reflections and provide a visual indication or warning of the presence and movement of the autonomous luggage cart 1.

A display-input unit 17 is provided, mounted on a riser pole 4 at a level above the floor 2 where users can see and reach the unit. The display-input unit 17 displays information about the operation of the autonomous luggage cart 1 and can also be used to display other information or advertisements. The display-input unit 17 also provides for the input of information, optionally including payment information such as the swiping or reading of a card, smartphone, or other device.

Figure 4:
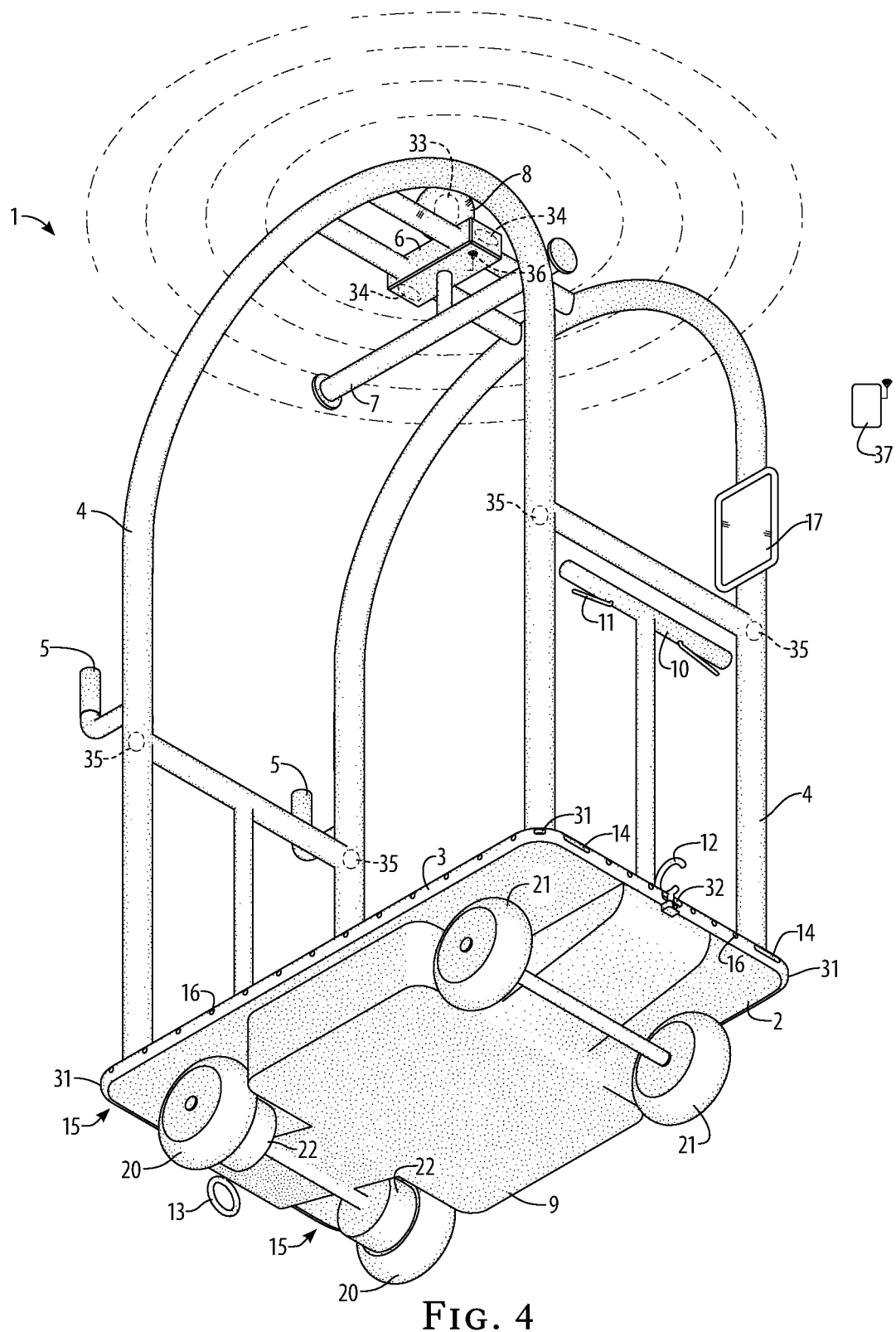
FIG. 4 is an isometric underside view of the autonomous luggage cart of the invention.
Figure 5:
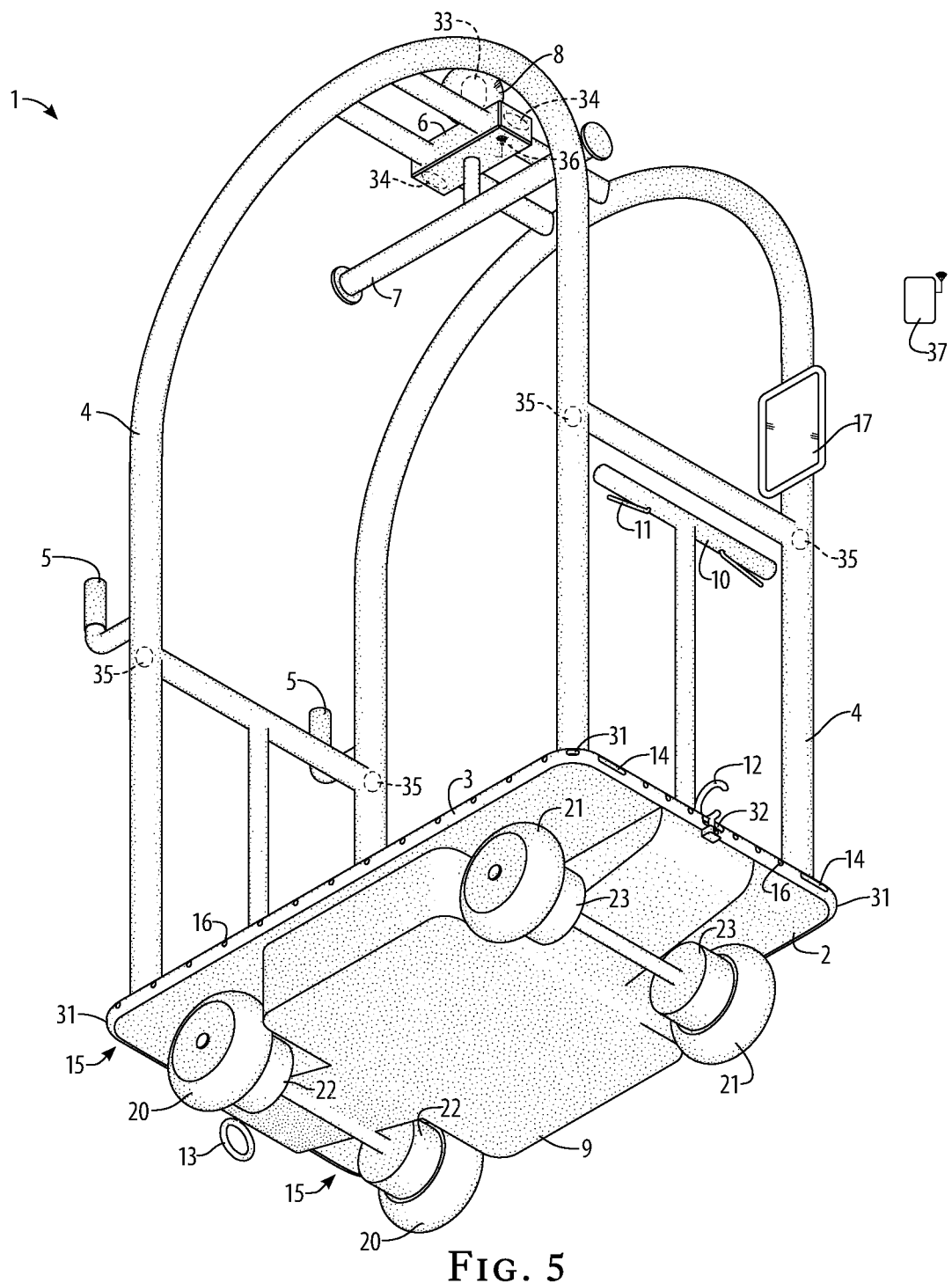
FIG. 5 is an isometric underside view of an embodiment of the autonomous luggage cart of the invention having front wheel motors.

Referring additionally to FIG. 4, underneath the floor 2 are mounted two rear wheels 20 and two front wheels 21. The front wheels 21 can pivot to provide for turning. The rear wheels are driven by rear wheel motors 22. Referring briefly to FIG. 5, optionally, front wheel motors 23 can be provided to drive the front wheels 21. The rear wheel motors 22 and front wheel motors 23 are electric motors providing high torque at low speeds and providing variable speed. Brushless electric motors with 2000-Watt capacity can be used. In a preferred embodiment illustrated the wheels have a diameter of 8 inches, providing good traction and stability without requiring the floor 2 to be raised too high.

Referring back to FIG. 1, located within and protected by the underside housing 9 are a high-capacity battery 24 and a battery charge manager 25. The high-capacity battery 24 can comprise several separate cells and can use lithium-based cells known in the art. The battery unit is heavy and its placement under the floor 2 provides a low center of gravity and stability. The illustrated embodiment shows the high-capacity battery 24 separated into two units and placed centered between the front and rear edges. Separation of the units increases surface area available for cooling. Centering of the weight increases stability. The battery charge manager 25 monitors and controls the charging and discharging of the high-capacity battery 24. Optionally, the battery charge manager 25 can provide electrical charging contacts extending through the underside housing 9 or can provide for contactless inductive charging through the underside housing 9. An embodiment of the autonomous luggage cart 1 provides for automatic positioning of the cart and automatic connection and commencement of charging when the cart is at rest in a storage or staging area.

A controller unit 26 controls the operation of the autonomous luggage cart 1 by performing computational and artificial-intelligence processing based on input from several sensors and upon user commands, as treated below.

The autonomous luggage cart 1 provides corner sensors 31 mounted in the bumper 3 at the corners of the floor 2. The corner sensors 31 are proximity or distance sensors such as ultrasonic or LIDAR sensors. The placement of the corner sensors 31 is such that any object to the front, rear, or either side of the autonomous luggage cart 1 is detectable by two sensors, allowing for more precise determination of location and size of objects to be passed to the controller unit 26.

Tow-hitch sensors 32 are provided near the front tow hitch 12 and rear tow hitch 13. These sensors can signal each other and identify each other in order to provide the controller unit 26 with data to facilitate automatic coupling and uncoupling of the tow hitches.

The camera-sensor package 33 mounted within the multi-directional housing 8 can include video cameras, lasers, LIDAR, GPS, RADAR, infrared, and ultrasonic sensors which receive information from a wide field of coverage, such as a panoramic camera or pan-and-tilt camera, or a GPS antenna receiving signals from several areas of the sky. The information from the camera-sensor package 33 is used by the controller unit 26 for navigation of the autonomous luggage cart 1, including avoidance of obstacles, forwarding to a remote device or monitor in real time, and storage as a record of operations in the event of any questions or disputes about operations.

The directional sensors 34 mounted in or on the bi-directional housing 6 can also include video cameras, lasers, LIDAR, RADAR, infrared, and ultrasonic sensors which receive information from narrow fields of coverage in front of or in back of the autonomous luggage cart 1. The information from the directional sensors 34 is also used by the controller unit 26 for navigation of the autonomous luggage cart 1, including avoidance of obstacles, forwarding to a remote device or monitor in real time, and storage as a record of operations in the event of any questions or disputes about operations.

RFID units 35 are provided, mounted within or upon the riser poles 4 at a fixed level above the floor 2 and close to the corners of the autonomous luggage cart 1. The RFID units 35 can be read by RFID readers fixed in position such as upon a wall or a post, where such fixed RFID readers can identify and record that a specific unit of the autonomous luggage cart 1 is currently present at a particular location or has passed a particular location at a known time. Also, the RFID units 35 can be read by portable or hand-held RFID readers for the purpose of identifying specific units while deployed. Optionally, the RFID units 35 can also include RFID readers, providing information to the controller unit 26 which can be used to confirm specific locations or be used to trigger changes in operation such as a manual override by a staff person having the appropriate RFID tag in a card or identification badge.

The autonomous luggage cart 1 provides a communications unit 36 which sends and receives wireless signals, providing for communications with external entities such as a command, control, and scheduling entity elsewhere on or off the premises. The communications unit 36 also provides for communications with remote units 37, which can be dedicated units carried by staff persons or can be implemented on smartphones or similar devices having wireless communications capabilities. Wireless communications technologies such as Wi-Fi™ Bluetooth®, and cellular-networks can be used by the communications unit. The use of Wi-Fi™ can take advantage of extensive Wi-Fi™ network infrastructure already operating at many facilities. If a facility has sufficient cellular bandwidth and coverage, a cellular network can be used.

Figure 2:
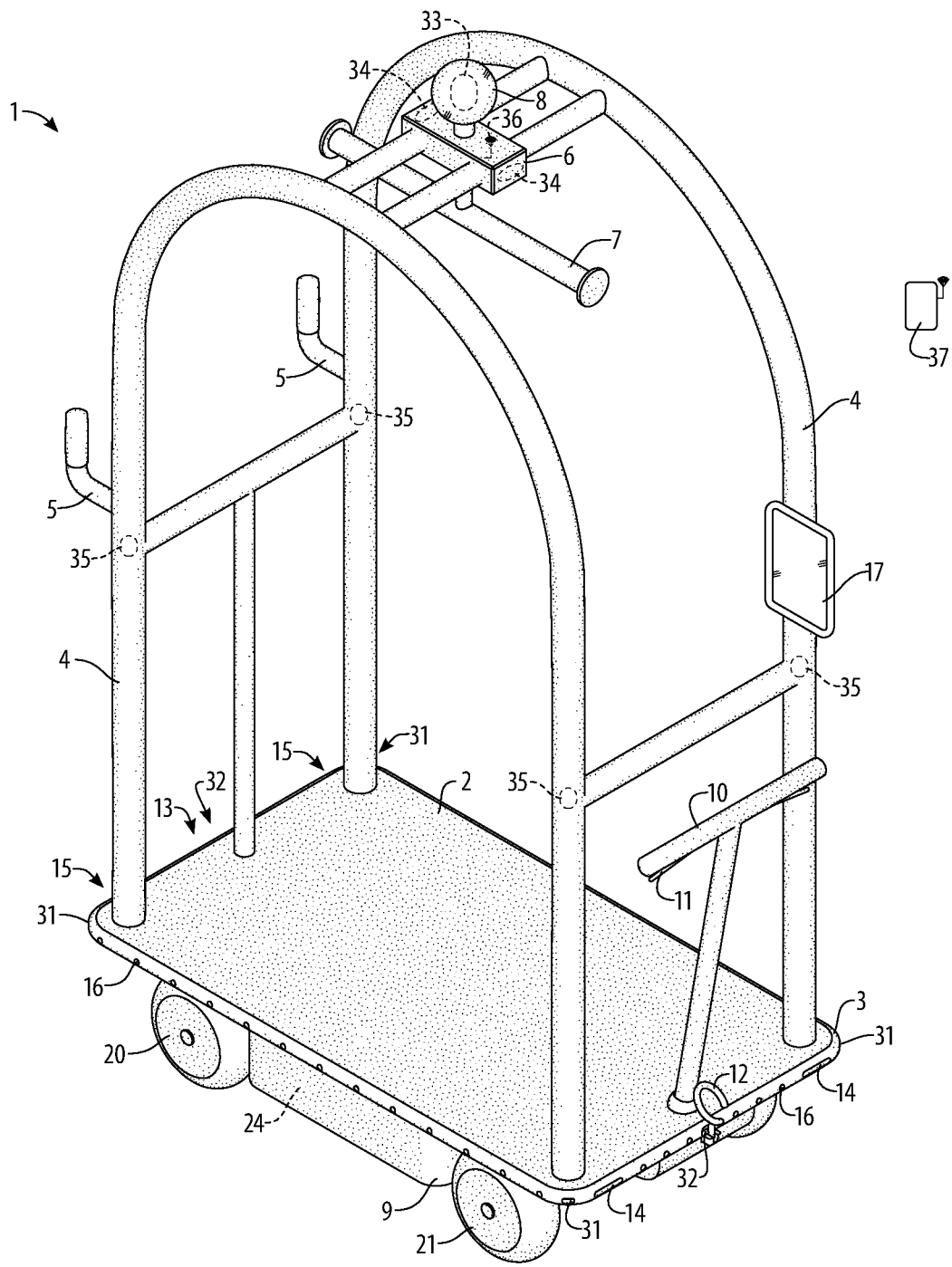
FIG. 2 is an isometric view of the autonomous luggage cart of the invention under manual control.
Figure 3:
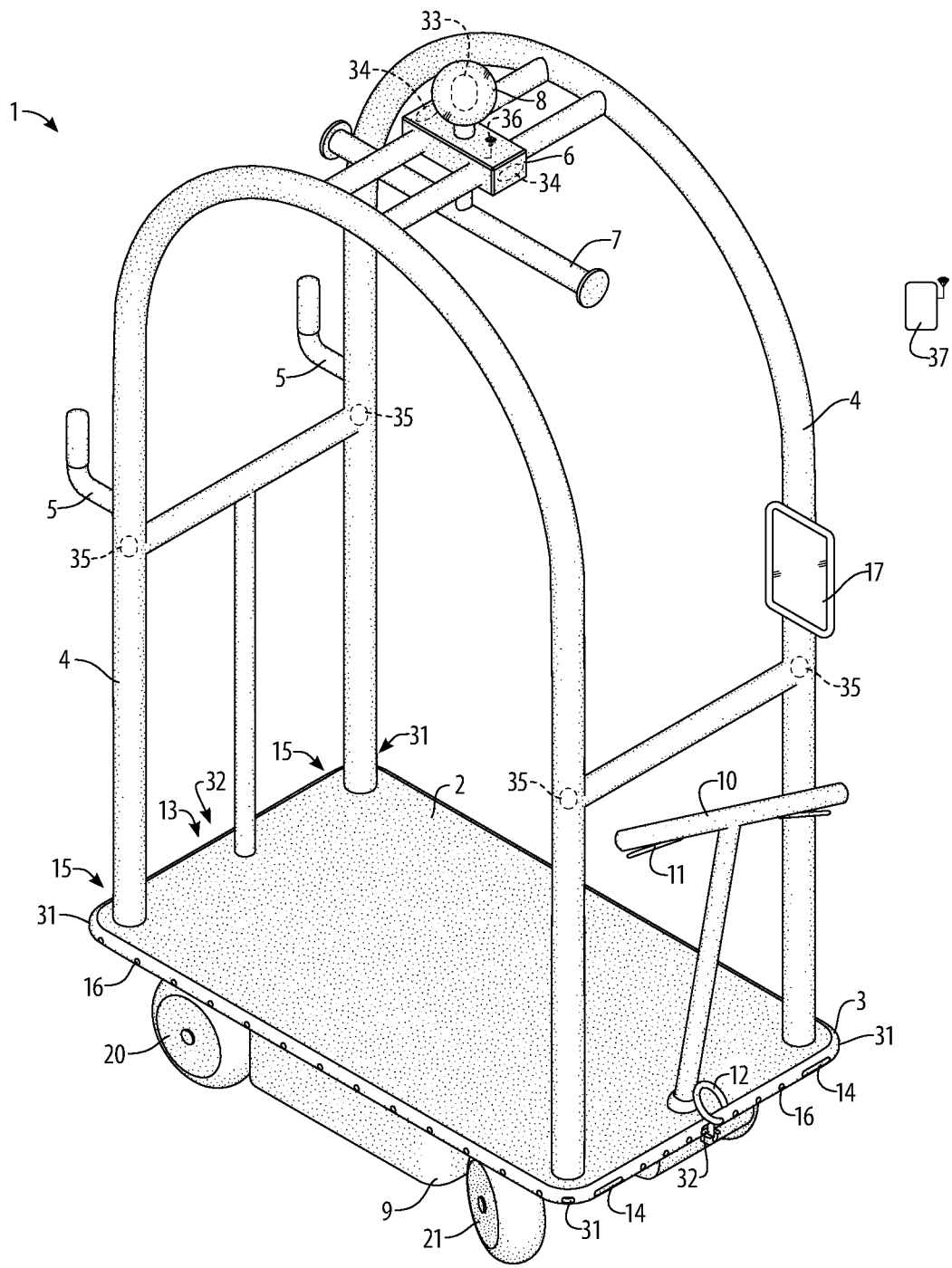
FIG. 3 is an isometric view of the autonomous luggage cart of the invention being turned by manual control.
Figure 6:
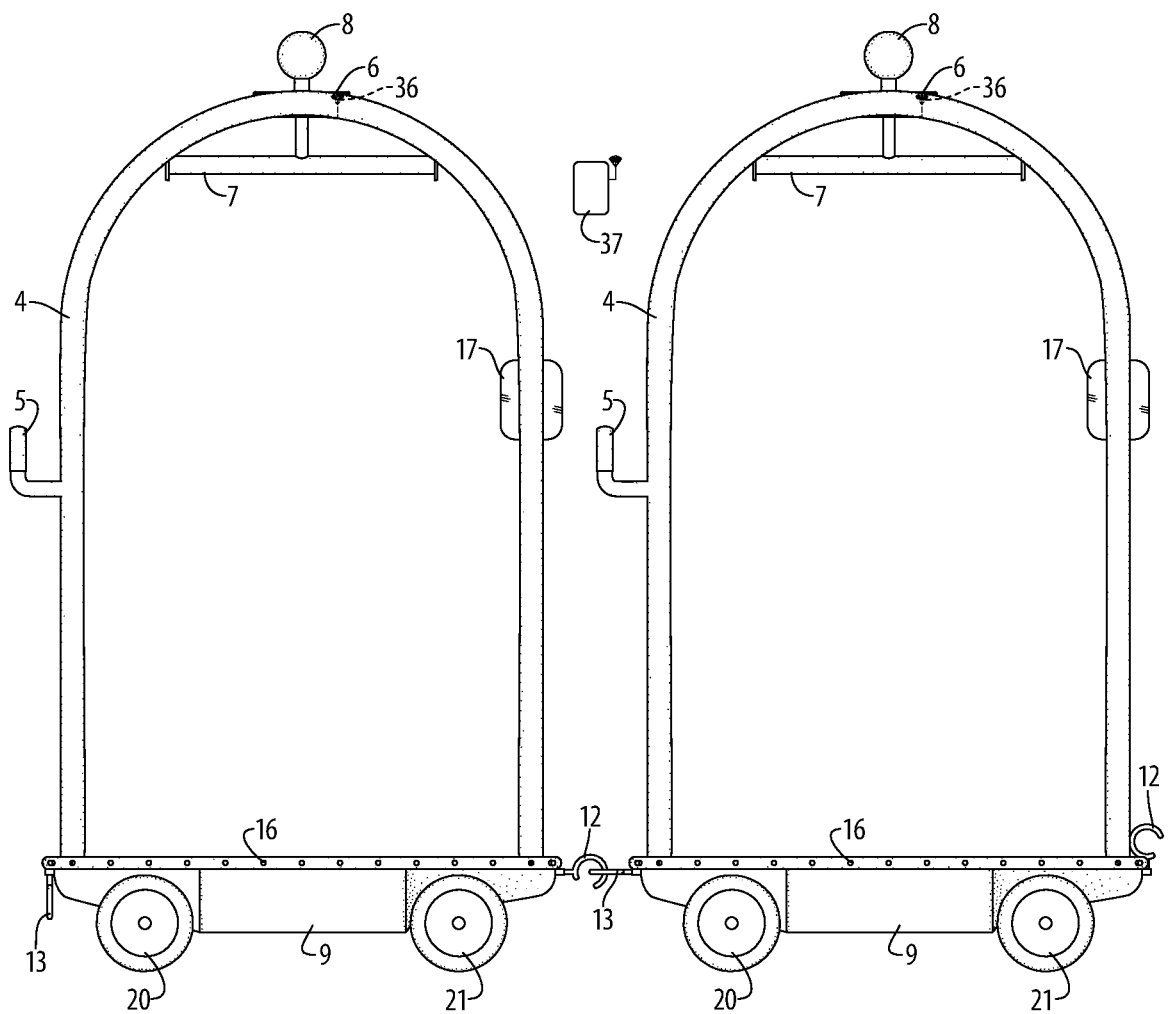
FIG. 6 is a side view of the autonomous luggage cart of the invention in a towing configuration.
Figure 7:
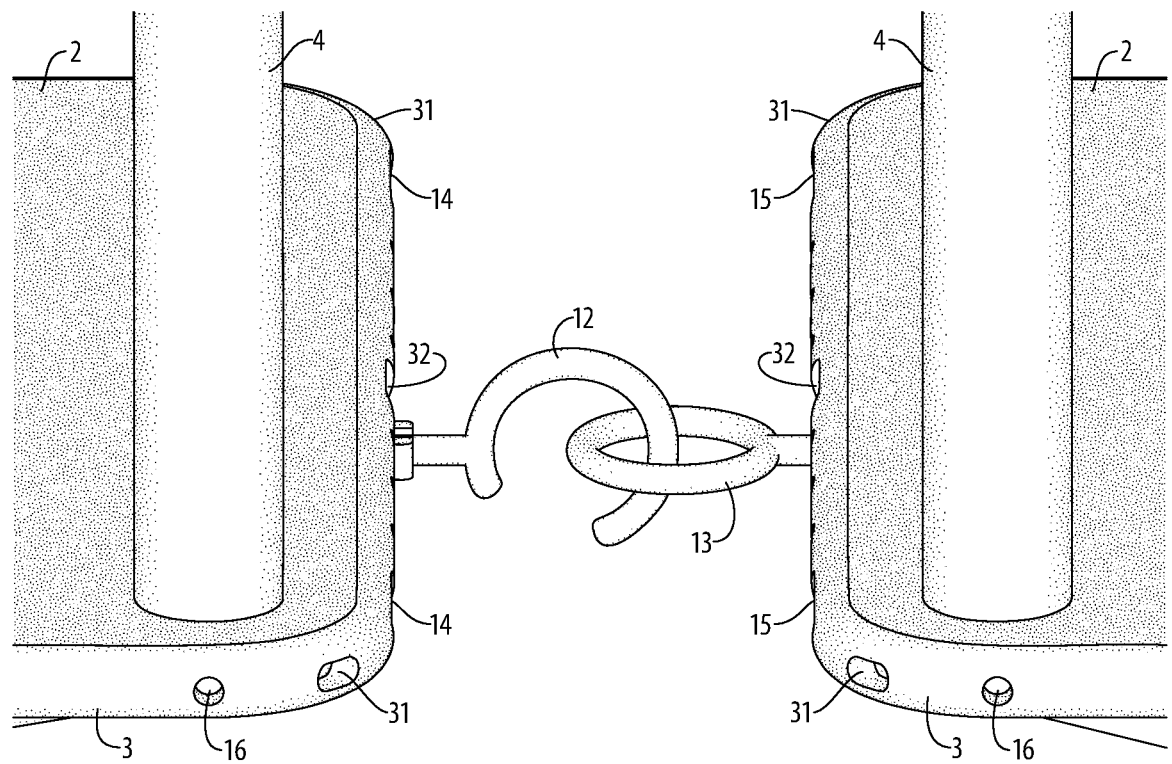
FIG. 7 is a detail view of the autonomous luggage cart of the invention in a towing configuration.

Referring to FIG. 2, in use the autonomous luggage cart 1 can move and navigate autonomously under electric power, can move under electric power with manual control, or can be moved and controlled manually. Manual movement and control of the cart entails a risk of injury such as strain to the person moving the cart, and to other persons and property. Movement under electrical power with manual control entails less risk of injury to the person controlling the cart, and sensor-based safety features of autonomous control can be implemented as alarms or overrides to manual control. In use under electric power with manual control, the throttle handle 10 can be pulled into a forward tilting position to activate electric operation and can be rotated for steering. Movement can be stopped using the throttle brake 11. Referring to FIG. 3, when tilted outward, rotation of the throttle handle 10 causes a corresponding pivoting of the front wheels 21, steering the autonomous luggage cart 1 in the desired direction. An alternative method of manual control is the use of a remote unit 37 carried by a person accompanying the cart, Referring to FIG. 6 and FIG. 7, the autonomous luggage cart 1 provides a front tow hitch 12 and a rear tow hitch 13. When the autonomous luggage cart 1 is not towing or being towed by another cart, both the front tow hitch 12 and the rear tow hitch 13 are positioned out of the way, with no extension or minimal extension beyond the bumper 3. During towing operations, the rear tow hitch 13 of the towing cart and the front tow hitch 12 of the towed cart are extended such that a towing connection is made. In the illustrated embodiment the rear tow hitch 13 is a closed loop and the front tow hitch 12 is an open loop or hook. Other configurations are possible, such as bayonet connectors. During towing operations, the controller units 26 of the towing cart and the towed cart communicate through the tow hitch sensors 32 of the carts, providing coordination in applying moving force, if needed, or braking force.

In a preferred embodiment of the autonomous luggage cart 1, the joining of the towing and towed carts through a front tow hitch 12 and rear tow hitch 13 can be performed autonomously without manual intervention. Using information from the relevant tow-hitch sensors 32, the controller units 26 of the carts move into position and automatically extend and connect the relevant tow hitches. After towing is completed the towing connection is automatically released and the tow hitches returned to retracted positions. More than two autonomous luggage carts 1 can be connected in a towing configuration. Towing can be used to retrieve carts with electrical or electronic failure. The autonomous luggage cart 1 can optionally be provided in a tug embodiment, having enhanced battery capacity and motor power, for towing greater numbers of carts.

In use as a bellman cart, porter cart, luggage cart, hotel cart, etc., for transporting luggage and personal items in facilities such as hotels, condos, universities, and convention centers, the controller unit 26 of the autonomous luggage cart 1 communicates through the communications unit 36 with the management, services, scheduling, and point-of-sales systems of the facility. If fees for use of the autonomous luggage cart 1 are collected, electronic payment by card or other device can be made through the display-input unit 17 communicating through the controller unit 26 with payment or point-of-sale systems of the facility.

In use, the autonomous luggage cart 1 can travel to a location such as a numbered room via a route different from the route used by persons, such as back-of-house hallways and service elevators, quickly, efficiently, and securely.

In use, the autonomous luggage cart 1 can provide a self-service cart which can be ordered via a kiosk or a smartphone app, which will navigate to a defined location, such as a numbered parking or loading spot, to be loaded, and which will transport the loaded objects to a defined destination or will follow the user to a destination.

The controller unit 26 controls the operations of the autonomous luggage cart 1 using machine-learning and artificial-intelligence methods to learn and map the environment and conditions at the facility, creating an ability to calculate alternative routes and to respond to changing circumstances. Among the applications of artificial-intelligence methods can be an ability to identify a person such as a customer or a staff person and follow that person automatically and safely to a destination, or to raise an alarm if any different person attempts to divert the cart or remove any items. Another application of artificial-intelligence methods can be a return-to-home function to be implemented in the proper circumstances.

The autonomous luggage cart 1 provides security of luggage and objects transported through the recording of operations and through artificial-intelligence methods of detecting unauthorized access to the cart or unauthorized diversion of the cart. Where needed, additional security can be provided by enclosing the cart with a net or a screen, either permanently or temporarily. Where privacy is needed, the net or screen can be made partially or fully opaque.

Many other changes and modifications can be made in the system and method of the present invention without departing from the spirit thereof. I therefore pray that my rights to the present invention be limited only by the scope of the appended claims.

I claim:

1. An autonomous luggage cart comprising:
   (i) a floor having front-to-back length of 32 to 42 inches inclusive and side-to-side width of 18 to 24 inches inclusive;
   (ii) a bumper surrounding a perimeter of said floor;
   (iii) at least one riser pole arrayed upon said floor and extending upward from said floor from at least two points;
   (iv) a bi-directional housing mounted near a top of said riser poles;
   (v) a multi-directional housing mounted above said bi-directional housing;
   (vi) an underside housing mounted on an underside of said floor;
   (vii) a throttle handle mounted on said floor, adapted to allow manual control of movement;
   (viii) a throttle brake mounted on said throttle handle, adapted to stop movement;
   (ix) a front tow hitch mounted at a front of said floor, adapted to extend from and withdraw toward said floor and said bumper;
   (x) a rear tow hitch mounted at a rear of said floor, adapted to extend from and withdraw toward said floor and said bumper;
   (xi) a pair of front lights mounted at the front of said floor and said bumper;
   (xii) a pair of rear lights mounted at the rear of said floor and said bumper;
   (xiii) a plurality of surround lights mounted at the perimeter of said floor and said bumper;
   (xiv) a display-input unit mounted upon a said riser pole, adapted to display information and facilitate input of information;
   (xv) a pair of rear wheels mounted below said floor;
   (xvi) a pair of rear wheel motors, adapted to drive said rear wheels using electrical power;
   (xvii) a pair of front wheels mounted below said floor, adapted for steering;
   (xviii) a high-capacity battery mounted below said floor within said underside housing, adapted to provide electrical power for driving said rear wheel motors;
   (xix) a battery charge manager mounted below said floor within said underside housing, adapted to charging and discharging of said high-capacity battery;
   (xx) four corner sensors, each mounted at a corner of said floor and said bumper, adapted to sense proximity, location, and size of objects;
   (xxi) two tow-hitch sensors, mounted adjacent to said front tow hitch and said rear tow hitch, adapted to send and receive signals each from the other;
   (xxii) a camera-sensor package mounted within said multi-directional housing, adapted to sense information from a wide field of coverage;
   (xxiii) a plurality of directional sensors mounted within said bi-directional housing, adapted to sense information from narrow fields of coverage from front and rear directions;
   (xxiv) at least one RFID unit mounted on a said riser pole, adapted to send information to RFID readers;
   (xxv) a controller unit mounted below said floor within said underside housing, adapted to receive the information from said corner sensors, tow-hitch sensors, camera-sensor package, and directional sensors, to analyze such the information applying machine-learning and artificial-intelligence methods, and to control operations of said autonomous luggage cart;
   (xxvi) a communications unit adapted to send and receive wireless signals to provide communications with external entities; and
   (xxvii) a remote unit adapted to communicate wirelessly with said communications unit.

2. The autonomous luggage cart of claim 1, where said bumper further comprises sensors adapted to sense contact with an object.

3. The autonomous luggage cart of claim 1, where said riser poles form an arch.

4. The autonomous luggage cart of claim 1, further comprising front wheel motors adapted to drive said front wheels using electrical power.

5. The autonomous luggage cart of claim 1, further comprising a hanging support mounted below said bi-directional housing, where the hanging support is adapted to provide for hanging of luggage.

6. The autonomous luggage cart of claim 1, further comprising hand grips mounted upon said riser poles.

7. The autonomous luggage cart of claim 1, where said display-input unit is further adapted for acceptance of payment information.

8. The autonomous luggage cart of claim 1, where said battery charge manager further comprises electrical charging contacts extending through said underside housing.

9. The autonomous luggage cart of claim 1, where said battery charge manager further comprises contactless inductive charging through said underside housing.

10. The autonomous luggage cart of claim 1, where said controller unit and said battery charge manager provide for automatic positioning of said autonomous luggage cart and automatic connection and commencement of charging.

11. The autonomous luggage cart of claim 1, where said high-capacity battery further comprises a plurality of separate cells.

12. The autonomous luggage cart of claim 1, where said high-capacity battery further comprises lithium-based cells.

13. The autonomous luggage cart of claim 1, where said high-capacity battery is mounted within said underside housing centered between the front and rear edges of said floor.

14. The autonomous luggage cart of claim 1, where said underside housing further comprises composition of a heat conducting material conducive to cooling enclosed components.

15. The autonomous luggage cart of claim 1, where said RFID units further comprise RFID readers.

16. The autonomous luggage cart of claim 1, further comprising a tug embodiment.

17. The autonomous luggage cart of claim 1, where said front tow hitch and rear tow hitch further comprise adaptation for joining of the autonomous luggage cart with another luggage cart for towing the other luggage cart autonomously without manual intervention.

18. An autonomous luggage cart method comprising:
  (i) providing an autonomous luggage cart comprising:
    (a) a floor having front-to-back length of 32 to 42 inches inclusive and side-to-side width of 18 to 24 inches inclusive;
    (b) a bumper surrounding a perimeter of said floor;
    (c) at least one riser pole arrayed upon said floor and extending upward from said floor from at least two points;
    (d) a bi-directional housing mounted near a top of said riser poles;
    (e) a multi-directional housing mounted above said bi-directional housing;
    (f) an underside housing mounted on an underside of said floor;
    (g) a throttle handle mounted on said floor, adapted to allow manual control of movement;
    (h) a throttle brake mounted on said throttle handle, adapted to stop movement;
    (i) a front tow hitch mounted at a front of said floor, adapted to extend from and withdraw toward said floor and said bumper;
    (j) a rear tow hitch mounted at a rear of said floor, adapted to extend from and withdraw toward said floor and said bumper;
    (k) a pair of front lights mounted at the front of said floor and said bumper;
    (l) a pair of rear lights mounted at the rear of said floor and said bumper;
    (m) a plurality of surround lights mounted at the perimeter of said floor and said bumper;
    (n) a display-input unit mounted upon a said riser pole, adapted to display information and facilitate input of information;
    (o) a pair of rear wheels mounted below said floor;
    (p) a pair of rear wheel motors, adapted to drive said rear wheels using electrical power;
    (q) a pair of front wheels mounted below said floor, adapted for steering;
    (r) a high-capacity battery mounted below said floor within said underside housing, adapted to provide electrical power for driving said rear wheel motors;
    (s) a battery charge manager mounted below said floor within said underside housing, adapted to charging and discharging of said high-capacity battery;
    (t) four corner sensors, each mounted at a corner of said floor and said bumper, adapted to sense proximity, location, and size of objects;
    (u) two tow-hitch sensors, mounted adjacent to said front tow hitch and said rear tow hitch, adapted to send and receive signals each from the other;
    (v) a camera-sensor package mounted within said multi-directional housing, adapted to sense information from a wide field of coverage;
    (w) a plurality of directional sensors mounted within said bi-directional housing, adapted to sense information from narrow fields of coverage from front and rear directions;
    (x) at least one RFID unit mounted on a said riser pole, adapted to send information to RFID readers;
    (y) a controller unit mounted below said floor within said underside housing, adapted to receive the information from said corner sensors, tow-hitch sensors, camera-sensor package, and directional sensors, to analyze the information applying machine-learning and artificial-intelligence methods, and to control operations of said autonomous luggage cart;
    (z) a communications unit adapted to send and receive wireless signals to provide communications with external entities; and
    (aa) a remote unit adapted to communicate wirelessly with said communications unit;
  (ii) deploying said autonomous luggage carts;
  (iii) allowing users to request use of the autonomous luggage cart;
  (iv) transporting users luggage to a destination;
  (v) accepting payment from users through said display-input unit;
  (vi) returning the autonomous luggage cart to a staging area; and
  (vii) recharging the autonomous luggage cart through said battery charge manager.

* * * * *